United States Patent

Jager et al.

[11] 3,925,386
[45] Dec. 9, 1975

[54] 6-HYDROXY-DIHYDRO-URACILS, PROCESS FOR THEIR PREPARATION

[75] Inventors: Gerhard Jager, Wuppertal-Elberfeld; Hans Jurgen Wenzelburger, Wuppertal-Cronenberg; Robert R. Schmidt, Cologne, all of Germany

[73] Assignee: Bayer Aktiengesellschaft, Leverkusen, Germany

[22] Filed: June 28, 1972

[21] Appl. No.: 266,872

[30] Foreign Application Priority Data
July 1, 1971 Germany.......................... 2132763

[52] U.S. Cl........... 260/260; 260/244 R; 260/340.7; 71/92
[51] Int. Cl.²........................................ C07D 239/04
[58] Field of Search...................................... 260/260

[56] References Cited
UNITED STATES PATENTS
3,322,526  5/1967  Loux................................... 260/260
3,360,523  12/1967  Loux................................... 260/260

*Primary Examiner*—Donald G. Daus
*Assistant Examiner*—Anne Marie T. Tighe
*Attorney, Agent, or Firm*—Burgess, Dinklage & Sprung

[57] ABSTRACT
Novel 6-hydroxy-dihydro-uracil compounds of the formula:

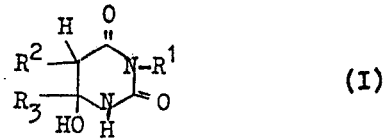

wherein
 $R^1$ is hydrocarbyl and substituted hydrocarbyl, both aliphatic and aromatic,
 $R^2$ is hydrogen, alkyl, or optionally, substituted aryl,
 $R^3$ is alkyl or aralkyl, and
 $R^2$ and $R^3$ together may be an alkylene bridge;

are prepared by reacting a 2,3-dihydro-1,3-oxazine-2,4-dione of the general formula

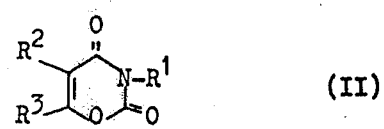

in which
 $R^1$, $R^2$ and $R^3$ have the above mentioned meanings, is reacted with ammonia at a temperature of $-50°C$ to $+50°C$, optionally in the presence of a diluent, but in the substantial absence of water. These compounds are herbicidally active.

26 Claims, No Drawings

6-HYDROXY-DIHYDRO-URACILS, PROCESS FOR THEIR PREPARATION

The present invention relates to certain novel 6-hydroxy-dihydro-uracil compounds and to a process for their preparation. In addition, the invention relates to herbicidal compositions containing such compounds and to their use as herbicides.

It is known that 5-halo-6-hydroxy-dihydro-uracils are obtained if uracils are reacted with hypochlorite or hypobromite according to formula scheme (a) below (see U.S. Patent Nos. 3,322,526, 3,360,523, 3,406,023 and 3,455,280, German DOS (Published Specification) 1,567,037, Chemisches Zentralblatt 1969, Ref. No. 56-0977, Angewandte Chemie, 81, 581–597 (1969):

(a)

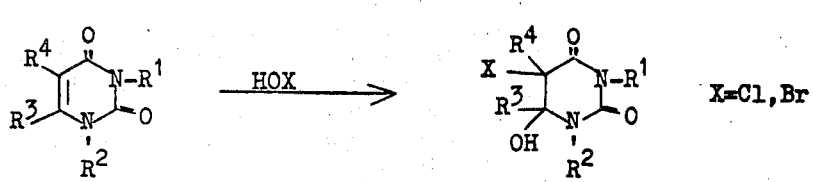

It has furthermore been disclosed that 6-hydroxy-dihydro-uracil is obtained if an aqueous uracil solution is irradiated with ultraviolet light in accordance with formula scheme (b) below (compare Angewandte Chemie 81, 581–595 (1969) or if 5,5-dibromo-6-hydroxy-dihydro-uracil is debrominated with Raney nickel in the presence of barium carbonate, according to formula scheme (c) below (compare Liebigs Annalen der Chemie 670, 84 –to (1963)) and the reaction mixtures thereby obtained are purified chromatographically:

(b)

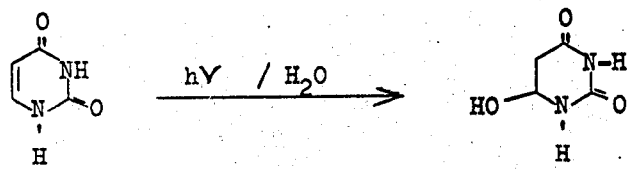

(c)

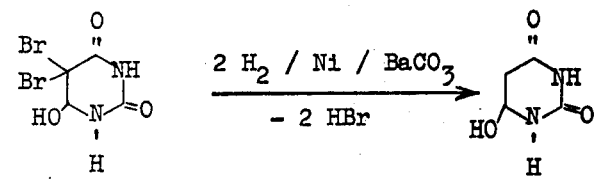

It is furthermore known that 5-methyl-6-hydroxy-dihydro-uracil occurs, together with other products, during the hydrogenating debromination of 5-bromo-5-methyl-6-hydroxy-dihydro-uracil with zinc in acetic acid according to formula scheme (d) below (compare Comptes Rendues, Series C, 263, 1401 – 1403 (1966)):

(d)

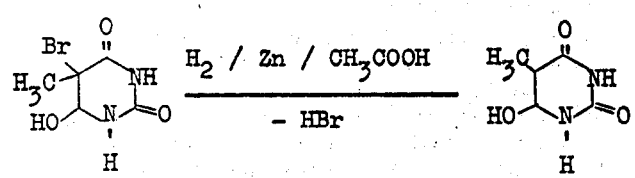

5,6-dihydroxy-5-methyl-dihydro-uracil is again obtained alongside other products by radiolysis of thymin in aqueous aerated solution according to formula scheme (e) below (compare Bulletin de la Societe Chimique de France 1970, 927–932) or by hydroxylation of thymin with potassium permanganate at a pH-value of 7, according to formula scheme (f) (compare Journal of the Chemical Society [London] 1960, 1014 - 1023, Tetrahedron Letters 1969, 1031- 1034):

(e)

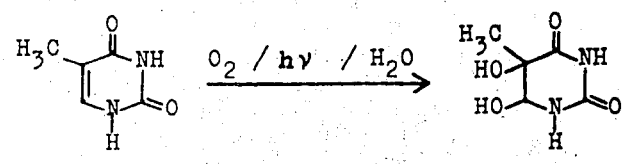

(f)

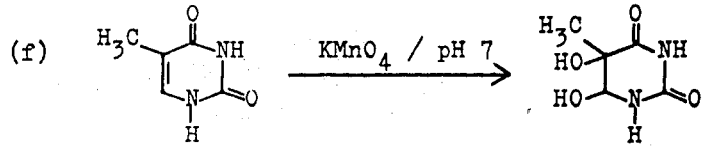

However, these processes suffer from various disadvantages. Thus, only 5-halo-6-hydroxy-dihydro-uracies, but not halogen-free compounds, can be manufactured in accordance with the process mentioned under (a). The modes of formation listed under (b) to (f) are restricted to the examples mentioned. They are not transferable to the production of N-(3)-substituted 6-hydroxy-dihydro-uracils.

Furthermore, the modes of formation mentioned under (b) to (f) result in the compounds being produced in only low yeilds, mixed with other reaction products, so that expensive chromatographic working-up and purification become necessary.

The present invention provides 6-hydroxy-dehydro-uracils of the general formula

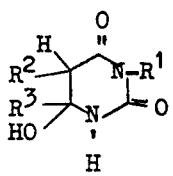 (I)

in which
R$^1$ is alkyl, alkenyl, alkynyl, haloalkyl, cyanoalkyl, alkoxyalkyl, alkoxycarbonylalkyl, cycloalkyl, alkylcarbonyl, alkoxycarbonyl, alkoxyalkylcarbonyl, aryloxyalkylcarbonyl, arylthioalkylcarbonyl, or optionally substituted aryl, aralkyl, arylsulphonyl or arylcarbonyl, or an optionally substituted heterocyclic radical, and
R$^2$ is hydrogen, alkyl or optionally substituted aryl, and
R$^3$ is alkyl or aralkyl, or
R$^2$ and R$^3$ together are a multi-unit methylene bridge forming a fused, optionally alkyl-substituted, ring with the two carbon atoms in the 5,6-position.

The invention also provides a process for the production of a compound of formula (I) in which 2,3-dihydro-1,3-oxazine-2,4-dione of the general formula

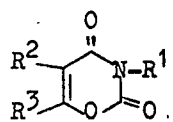 (II)

in which
R$^1$, R$^2$ and R$^3$ have the above-mentioned meanings, is reacted with ammonia at a temperature of −50°C to +50°C, optionally in the presence of a diluent, but in the substantial absence of water. By this process it is possible to obtain the compounds of the formula (I) in good yields and with a high degree of purity.

Preferably, R$^1$ is straight-chain or branched alkyl of from 1 to 13 carbon atoms; straight-chain or branched alkenyl of from 3 to 6 carbon atoms; straight-chain or branched alkynyl of from 3 to 6 carbon atoms; cycloalkyl of from 5 to 8 carbon atoms; halo-alkyl of from 2 to 6 carbon atoms and 1 to 3 halogen atoms, especially fluorine or chlorine; cyanoalkyl of from 1 to 6 carbon atoms; alkoxyalkyl or alkoxycarbonylalkyl of from 1 to 4 carbon atoms in the alkyl moiety and 1 to 3 carbon atoms in the alkoxy moiety; alkylcarbonyl, alkoxycarbonyl or alkoxyalkylcarbonyl with 2 to 6 carbon atoms in the alkyl moiety and 1 to 4 carbon atoms in any alkoxy moiety; phenoxyalkylcarbonyl or phenylthioalkylcarbonyl optionally substituted in the phenyl nucleus and having 1 to 3 carbon atoms in the alkyl moiety; optionally substituted aryl, aralkyl, arylcarbonyl or arylsulfonyl with 6 to 10 carbon atoms in the aryl moiety and 1 or 2 carbon atoms in any alkyl moiety, or an optionally substituted five to seven membered heterocyclic radical, the optional substituents of the aryl moiety or of the heterocyclic structure being straight-chain or branched alkyl with 1 to 6 carbon atoms, haloalkyl of from 1 to 4 carbon atoms and 1 to 3 halogen atoms, especially fluorine or chlorine, alkoxy or alkylthio of from 1 to 4 carbon atoms, alkylsulfonyl of from 1 to 4 carbon atoms, nitro and/or halogen, especially fluorine, chlorine or bromine; and R$^2$ represents hydrogen, straight-chained or branched alkyl of from 1 to 6 carbon atoms or phenyl optionally substituted by any of the substituents for aryl mentioned above; and R$^3$ represents straight-chain or branched alkyl with 1 to 6 carbon atoms or aralkyl of from 6 carbon atoms in the aryl part and 1 to 3 carbon atoms in the alkyl part; or R$^2$ and R$^3$ together represent a straight-chain or branched methylene bridge of from 3 to 8 carbons which forms, with the two adjacent carbon atoms of the ring shown in formula (I), a five to seven membered ring which may be substituted by alkyl of from 1 to 3 carbon atoms.

It must be regarded as distinctly surprising that according to the process of the invention 6-hydroxy-dihydro-uracils of the formula (I) may be obtained in good yields and with excellent purity, since in view of what was hitherto known it was to be expected that the reaction of cyclic carbamates with ammonia would lead to the corresponding cyclic ureas, the uracils (compare H. Chem. Soc. 1954 (London), 845 – 849). It is furthermore known that oxygen-containing heterocyclic compounds, for example pyrylium salts, react with ammonia to give the corresponding nitrogen-containing ring systems, for example pyridines (compare Berichte der Deutschen Chemischen Gesellschaft 43, 2341 – 2342 (1910)). Here again, the reaction does not stop at the stage of the dihydroxy compounds.

The process according to the invention shows a number of advantages. Thus, it is suitable for the synthesis of 6-hydroxy-dihydro-uracils of the formula (I) which do not carry halogen in the R$^2$- and R$^3$-position, and is not restricted merely to the manufacture of some representatives of this class, as are the processes (b) to (f). Furthermore, all chromatographic working-up and purification operations which are required in the previously known processes, may be dispensed with.

If, for example, 3-phenyl-6-methyl-2,3-dihydro-1,3-oxazine-2,4-dione and ammonia are used as the starting substances, the course of the reaction can be represented by the following equation:

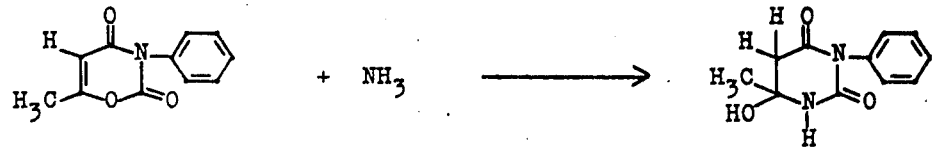

The 2,3-dihydro-1,3-oxazine-2,4-diones are generally defined by the formula (II).

As examples of these diones, the following may be mentioned individually:

3-phenyl-2,3,4,5,6,7-hexahydro-cyclopenta[e]-1,3-oxazine-2,4-dione, 3-(4'-chlorophenyl)-2,3,4,5,6,7-hexahydro-cyclopenta[e]-1,3-oxazine-2,4-dione, 3-(3'-chlorophenyl)-2,3,4,5,6,7-hexahydro-cyclopenta[e]-1,3-oxazine-2,4-dione, 3-(4'-chlorophenyl)-7,7-dimethyl-2,3,4,5,6,7-hexahydro-cyclopenta[e]-1,3-oxazine-2,4-dione, 3-(4'-chlorophenyl)-5,7,7-trimethyl-2,3,4,5,6,7-hexahydro-cyclopenta[e]-1,3-oxazine-2,4-dione, 3-(3',4'-dichlorophenyl)-2,3,4,5,6,7-hexahydro-cyclopenta[e]-1,3-oxazine-2,4-dione, 3-(4'-trifluoromethyl)-2,3,4,5,6,7-hexahydro-cyclopenta[e]-1,3-oxazine-2,4-dione, 3-(2'-ethyl-phenyl)-2,3,4,5,6,7-hexahydro-cyclopenta[e]-1,3-oxazine-2,4-dione, 3-(3'-methylphenyl)-2,3,4,5,6,7-hexahydro-cyclopenta[e]-1,3-oxazine-2,4-dione, 3-(2',6'-diethyl-4-methylphenyl)-2,3,4,5,6,7-hexahydro-cyclopenta[e]-1,3-oxazine-2,4-dione, 3-(4'-methoxyphenyl)-2,3,4,5,6,7-hexahydro-cyclopenta[e]-1,3-oxazine-2,4-dione, 3-(β-phenylethyl)-2,3,4,5,6,7-hexahydro-cyclopenta[e]-1,3-oxazine-2,4-dione, 3-n-butyl-2,3,4,5,6,7-hexahydro-cyclopenta[e]-1,3-oxazine-2,4-dione, 3-(3'-chloro-4'-trifluoromethyl-phenyl)-6-methyl-2,3-dihydro-1,3-oxazine-2,4-dione, 3-(4'-chloro-3'-trifluoromethyl-phenyl)-6-methyl-2,3-dihydro-1,3-oxazine-2,4-dione, 3-phenyl-6-methyl-2,3-dihydro-1,3-oxazine-2,4-dione, 3-α-naphthyl-6-methyl-2,3-dihydro-1,3oxazine-2,4-dione, 3-benzyl-6-methyl-2,3-dihydro-1,3-oxazine-2,4-dione, 3-(3'-chlorophenyl)-6-methyl-2,3-dihydro-1,3-oxazine-2,4-dione, 3-(4'-chlorophenyl)-6-methyl-2,3-dihydro-1,3-oxazine-2,4-dione, 3-(4'-trifluoromethyl-phenyl)-6-methyl-2,3-dihydro-1,3-oxazine-2,4-dione, 3-(3'-difluoromethyl-phenyl)-6-methyl-2,3-dihydro-1,3-oxazine-2,4-dione, 3-(2',6'-diisopropylphenyl)-6-methyl-2,3-dihydro-1,3-oxazine-2,4-dione, 3-(4'-methoxyphenyl)-6-methyl-2,3-dihydro-1,3-oxazine-2,4-dione, 3-benzoyl-6-methyl-2,3-dihydro-1,3-oxazine-2,4-dione, 3-cyclohexyl-6-methyl-2,3-dihydro-1,3-oxazine-2,4-dione, 3-isopropyl-6-methyl-2,3-dihydro-1,3-oxazine-2,4-dione, 3-n-butyl-6-methyl-2,3-dihydro-1,3-oxazine-2,4-dione, 3-butyl-(2)-6-methyl-2,3-dihydro-1,3-oxazine-2,4-dione, 3-pentyl-(3)-6-methyl-2,3-dihydro-1,3-oxazine-2,4-dione, 3-(4-methylpentyl)-6-methyl-2,3-dihydro-1,3-oxazine-2,4-dione, 3-(6'-chloro-n-hexyl)-6-methyl-2,3-dihydro-1,3-oxazine-2,4-dione, 3-(6-chlorocyclohexyl)-6-methyl-2,3-dihydro-1,3-oxazine-2,4-dione, 3-(2-chloroethyl)-6-methyl-2,3-dihydro-1,3-oxazine-2,4-dione, 3-(norbornyl-(2)-methyl)-6-methyl-2,3-dihydro-1,3-oxazine-2,4-dione, 3-ethoxycarbonylmethyl-6-methyl-2,3-dihydro-1,3-oxazine-2,4-dione and 3-(4-methyl-phenylsulphony)-6-methyl-2,3-dihydro-1,3-oxazine-2,4-dione.

Some of the 2,3-dihydro-1,3-oxazine-2,4-diones of the formula (II) are known (compare J. Chem. Soc. 1954 (London), 845 – 849). Some of the subject of a separate patent (compare German Patent Application P 2 005 118.7 (Le A 12 699)). They can be prepared by reacting 1,3-dioxin-4-ones of the general formula

(III)

in which
R² and R³ have the meanings indicated in formula (I),
R⁴ represents hydrogen of alkyl and
R⁵ represents alkyl or aryl with isocyanates of the general formula

R¹ N=C=O             (IV)

in which
R¹ has the meaning indicated in formula (I), optionally in the presence of inert organic solvents, at temperatures between about +80°C and +200°C (compare the preparative examples below).

The 1,3-dioxin-4-ones of the formula (III) required for this reaction can be obtained either by reaction of adipic acid dihalides with carbonyl compounds according to formula scheme (g) below (compare German Patent Application P19 57 312.7 (Le A 12 563) corresponding to British 54136/70) or by reaction of diketene or substituted diketenes with ketones in the presence of catalytic amounts of p-toluene-sulfonic acid according to formula scheme (h) below (compare Journal of the American Chemical Society 74,6305 (1952)):

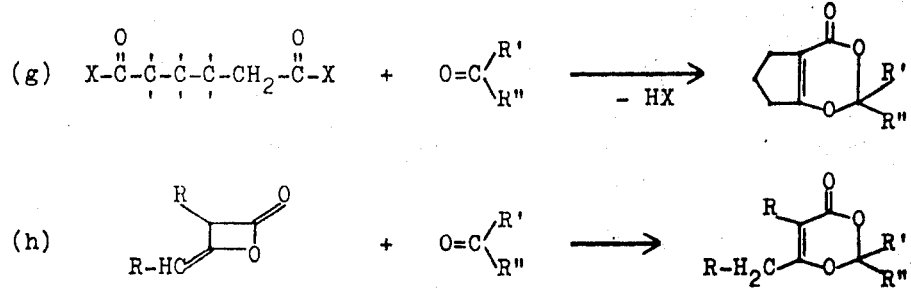

The reaction temperatures in the process according to the present invention can be varied over a wide range. In general the reaction is carried out at from −50°C to +50°C, preferably −35°C to +20°C.

The reaction is in general carried out at normal pressure, but it can also be carried out successfully at up to 10 atmospheres excess pressure.

Possible diluents in the process according to the invention are all inert organic solvents. These include hydrocarbons, such as dekalin (decahydronaphthalene), tetralin (1,2,3,4-tetrahydronaphthalene), toluene; alcohols, such as ethanol, methanol; and acid amides, such as dimethylformamide. Preferably, however, liquid ammonia itself, or a diluent which is a good solvent for ammonia, is used.

In a preferred method of carrying out the process according to the invention, 1 to 100 mols of ammonia, preferably 1 to 50 mols, are employed per mol of 2,3-dihydro-1,3-oxazine-2,4-dione of formula (II). The latter compound, either in bulk or dissolved in one of the above-mentioned solvents, may be added to the liquid ammonia or to the ammonia solution. The mixture may be stirred for some hours. For working up, the excess ammonia and any solvent may be distilled off under reduced pressure. The residue may be washed with ether and dried.

EXAMPLE 1

Preparation of
3-(3'-chlorophenyl)-6-methyl-6-hydroxy-5,6-dihydro-uracil

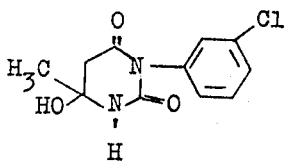

(Compound 1)

23.7 g (0.1 mol) of 3-(3'-chlorophenyl)-6-methyl-2,3-dihydro-1,3-oxazine-2,4-dione were added to 150 ml of liquid ammonia at −40°C whilst stirring and the batch was stirred for a further 2 hours at this temperature. Thereafter the ammonia was allowed to evaporate off; the residue was washed with ether and dried at room temperature in a high vacuum ($10^{-3}$ mm).

24 g (94.3% of theory) of 3-(3'-chlorophenyl)-6-methyl--6-hydroxy-5,6-dihydro-uracil of melting point 170°C were obtained.

EXAMPLE 2

Preparation of
3-cyclohexyl-6-methyl-6-hydroxy-5,6-dihydro-uracil

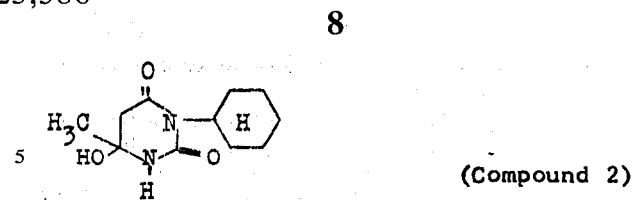

(Compound 2)

300 ml of liquid ammonia and 41.8 g (0.2 mol) of 3-cyclohexyl-6-methyl-2,3-dihydro-1,3-oxazine-2,4-dione were kept for 4 – 6 hours at −35°C in a shaking autoclave. During the last hours, the temperature was allowed gradually to rise to 0°C.

After distilling off the ammonia, washing the residue with ether and drying it in a high vacuum at room temperature, 42 g (93% pf theory) of 3-cyclohexyl-6-methyl-6-hydroxy-5,6-dihydro-uracil of melting point 175°C were obtained.

EXAMPLE 3

Preparation of
3-cyclohexyl-5,6-trimethylene-6-hydroxy-5,6-dihydro-uracil

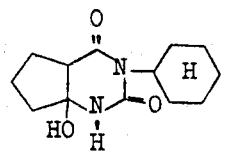

(Compound 3)

1,043 g (4.47 mols) of 3-cyclohexyl-2,3,4,5,6,7-hexa-hydro-cyclopenta[e]-1,3-oxazine-2,4-dione were introduced into 3,000 ml of liquid ammonia over the course of 30 minutes and thereafter the mixture was stirred for a further 2 hours with external cooling. The ammonia was subsequently driven off by dropwise addition of 2,000 ml of dry ether. The ether-in-soluble precipitate was filtered off and dried in vacuo at room temperature, and 1.017 g (90% of theory) of 3-cyclohexyl-5,6-trimethylene-6-hydroxy-5,6-dihydro-uracil of melting point 168°C (decomposition) were obtained.

The compounds listed in Table 1 below were prepared by processes analogous to those in Example 1–3. In this table and in Table 3 the meanings of $R^1$, $R^2$ and $R^3$ in formula (I) are indicated Table 1

| Example | $R^1$ | $R^2$ | $R^3$ | Melting point or decomposition point [°C] |
|---|---|---|---|---|
| 4 | ⟨CHF₂, Cl-phenyl⟩ | H | CH₃ | 170 – 180 |
| 5 | ⟨CH₃-phenyl⟩ | H | CH₃ | 140 |

Table 1-continued

| Example | R¹ | R² | R³ | Melting point or decomposition point [°C] |
|---|---|---|---|---|
| 6 | -C₆H₄-CH₃ (para) | H | $CH_3$ | 210 – 220 |
| 7 | -C₆H₅ | H | $CH_3$ | 180 |
| 8 | -naphthyl (1-) | H | $CH_3$ | 130 |
| 9 | -C₆H₃(Cl)₂ (3,4-dichlorophenyl) | H | $CH_3$ | 270 |
| 10 | -C₆H₁₁ (cyclohexyl) | H | $CH_3$ | 175* |
| 11 | $C_4H_9$ | H | $CH_3$ | 130 – 140 |
| 12 | $-CH_2-CH(CH_3)_2$ | H | $CH_3$ | 160 – 165 |
| 13 | $-CH_2-COOC_2H_5$ | H | $CH_3$ | 110 – 116 |
| 14 | $-CH(CH_3)-(CH_2)_2-CH_3$ | H | $CH_3$ | 115 – 117 |
| 15 | $-CH(C_3H_7)-C_3H_7$ | H | $CH_3$ | 111 – 113 |
| 16 | $-CH(C_2H_5)-CN$ | H | $CH_3$ | highly viscous oil |
| 17 | -C₆H₅ | $-(CH_2)_3-$ | | 200 |
| 18 | -C₆H₄-Cl (meta) | $-(CH_2)_3-$ | | 183 – 184 |
| 19 | -C₆H₄-Cl (para) | $-(CH_2)_3-$ | | 250 |
| 20 | -C₆H₃(Cl)₂ (3,4-dichlorophenyl) | $-(CH_2)_3-$ | | 225 |
| 21 | $-CH_2-CH_2-C_6H_5$ | $-(CH_2)_3-$ | | 139 – 141 |
| 22 | $C_4H_9$ | $-(CH_2)_3-$ | | 112 – 113 |
| 23 | $-CH(CH_3)-(CH_2)_{10}-CH_3$ | $-(CH_2)_3-$ | | 105 – 106 |
| 24 | $-CH_2-CO-OC_2H_5$ | $-(CH_2)_3-$ | | 117 – 119 |
| 25 | $-CH=CH-C_2H_5$ | $-(CH_2)_3-$ | | 115 – 116 |
| 26 | $-CO-C_6H_5$ | $-(CH_2)_3-$ | | 130 – 135 |
| 27 | -C₆H₃(Cl)₂ (3,4-dichlorophenyl) | $C_2H_5-$ | $n-C_3H_7-$ | 177 – 178 |

Table 1-continued

| Example | R¹ | R² R³ | Melting point or decomposition point [°C] |
|---|---|---|---|
| 28 | 4-Cl-C₆H₄- | $-CH_2-CH_2-C(CH_3)_2-$ | 202 |
| 29 | CH₃ | $-(CH_2)_3-$ | 154 – 155 |
| 30 | n–C₃H₇ | $-(CH_2)_3-$ | 134 – 135 |
| 31 | (CH₃)₂CH–CH₂ | $-(CH_2)_3-$ | 143 – 145 |
| 32 | (CH₃)₃C | $-(CH_2)_3-$ | 195 |
| 33 | 1-methylcyclohexyl | $-(CH_2)_3-$ | 178 – 179 |
| 34 | 4-methylcyclohexyl | $-(CH_2)_3-$ | 198 |
| 35 | cyclohexyl-CH₂- | $-(CH_2)_3-$ | 188 |
| 36 | cycloheptyl | $-(CH_2)_3-$ | 140 |
| 37 | cyclohexylidene=CH- | $-(CH_2)_3-$ | 176 |
| 38 | (CH₃)₂C=CH | $-(CH_2)_3-$ | 218 |
| 39 | 2,4-bis(CF₃)-C₆H₃- | $-(CH_2)_3-$ | 162 – 164 |
| 40 | 2,4-Cl₂-C₆H₃- | $-(CH_2)_3-$ | 165.5 – 167 |
| 41 | 2-CF₃-C₆H₄- | $-(CH_2)_3-$ | 158 – 161 |
| 42 | 2-OCH₃-4-Cl-C₆H₃- | $-(CH_2)_3-$ | 156 – 158 |
| 43 | 2-CF₃-4,6-Cl₂-C₆H₂- | $-(CH_2)_3-$ | 142 |

Table 1-continued

| Example | R¹ | R² | R³ | Melting point or decomposition point [°C] |
|---|---|---|---|---|
| 44 | 4-CF₃-C₆H₄- | —(CH₂)₃— | | >260 |
| 45 | 3-CF₃-4-Cl-C₆H₃- | —(CH₂)₃— | | 182 |
| 46 | 4-CF₂Cl-3-Cl-C₆H₃- | —(CH₂)₃— | | 167 – 169 |
| 47 | 3-CF₃-2-Cl-C₆H₃- | —(CH₂)₃— | | 250 |
| 48 | 4-CF₃O-3-Cl-C₆H₃- | —(CH₂)₃— | | 236 |
| 49 | 3-CF₃-C₆H₄- | —(CH₂)₃— | | 246 |
| 50 | 2-CH₃O-3-CF₃-C₆H₃- | —(CH₂)₃— | | 248 |
| 51 | 3-CF₃-4-Cl-C₆H₃- | —(CH₂)₃— | | 230 |
| 52 | 3-CF₃-4-CH₃S-C₆H₃- | —(CH₂)₃— | | 210 |
| 53 | 4-Cl-3-CHF₂-C₆H₃- | —(CH₂)₃— | | 196 |
| 54 | (CH₃)₂CH | H | CH₃ | 145 |
| 55 | C₃H₇—CH(CH₃)— | H | CH₃ | 111 – 113 |
| 56 | Cl—(CH₂)₆ | H | CH₃ | 100 |

Table 1-continued

| Example | R¹ | R² | R³ | Melting point or decomposition point [°C] |
|---|---|---|---|---|
| 57 | phenyl-CH₂- | H | CH₃ | 149 – 151 |
| 58 | Cl-phenyl- | H | CH₃ | >270 |
| 59 | CH₃O-phenyl(CF₃)- | H | CH₃ | 274 – 275 |
| 60 | CH₃S-phenyl(CF₃)- | H | CH₃ | 243 – 244 |
| 61 | CH₃O-phenyl(Cl)- | H | CH₃ | 270 |

*compound 10 was prepared in accordance with Example 2.

The starting material for the compound of Example 3 can be prepared as follows:

(A)
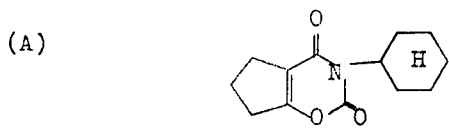

A solution of 168.2 g (1 mol) of 2,2-dimethylcyclopenta[e]-1,3-dioxin-4-one (the preparation of which is described below) in 300 ml of xylene was added dropwise over the course of 1½ hours to a solution, heated to 140°C, of 187.8 g (1.5 mols) of cyclohexylisocyanate in 250 ml of xylene. The acetone formed in the reaction was continuously distilled off and this removed from the reaction mixture. Thereafter the solvent was distilled off under reduced pressure and the residue was distilled in vacuo. 166.3 g (70% of theory) of 3-cyclohexyl-2,3,4,5,6,7-hexahydro-cyclopenta[e]-1,3-oxazine-2,4-dione of boiling point 164° – 165°C/0.5 mm, which solidified to crystals and then melted at 80° – 81°C, were obtained.

The new starting compounds listed in Table 2 below were prepared analogously:

Table 2

New starting compounds of the formula

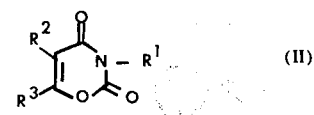 (II)

| Ex. No. | R¹ | R² | R³ | Melting point, °C Boiling point, °C/mm Hg Refractive index $n_D^{20}$ |
|---|---|---|---|---|
| (B) | 2-Cl-phenyl- | CH₃ | C₂H₅ | 190 |
| (C) | 2,6-Cl₂-phenyl- | C₂H₅ | C₃H₇ | 93 – 94 |
| (D) | C₂H₅O—C(O)—CH₂— | —(CH₂)₃— | | 162/0.5 |
| (E) | C₂H₅—CH=CH— | —(CH₂)₃— | | 134/0.2 |
| (F) | —CH—(CH₃)—(CH₂)₁₀—CH₃—(CH₂)₃— | | | 1.4897 |
| (G) | 2-CF₃-phenyl- | —(CH₂)₃— | | 147 – 148 |

Table 2-continued

New starting compounds of the formula

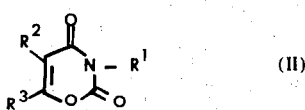

| Ex. No. | R¹ | R² | R³ | Melting point, °C Boiling point, °C/mm Hg Refractive index $n_D^{20}$ |
|---|---|---|---|---|
| (H) | 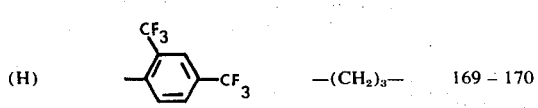 | | —(CH$_2$)$_3$— | 169 – 170 |
| (J) | 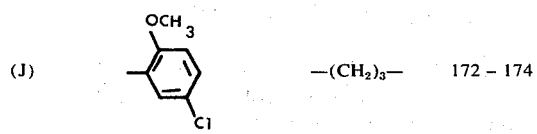 | | —(CH$_2$)$_3$— | 172 – 174 |

Preparation of 2,2-dimethyl-cyclapenta[e]-1,3-dioxin-4-one:

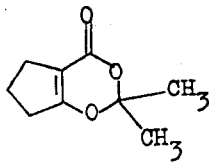

A solution of 80.8 g (0.8 mol) of triethylamine in 50 ml of ether was added dropwise to a solution of 73.2 g (0.4 mol) of adipic acid dichloride and 69.6 g (1.2 mols) of acetone in 700 ml of dry ether, whilst stirring, at such speed of addition that the reaction mixture just boiled. After completion of the addition of amine, the mixture was stirred for a further hour at room temperature, the triethylammonium chloride was filtered off and twice rinsed with 50 ml of dry ether, and the filtrate was evaporated in vacuo at a bath temperature of 20° to 30°C. The residue was taken up in about 100 ml of ether, treated with a little active charcoal, heated to the boil and filtered. On cooling the filtrate to between −40° and −50°C, 48.3 g of 2,2-dimethyl-cyclapenta[e]-1,3-dioxin-4-one were obtained in the form of colorless crystals of melting point 36° to 38°C. Yield: 71.5% of theory.

The new 6-hydroxy-dihydro-uracils according to the invention possess herbicidal properties and can therefore be employed for combating weeds.

Weeds in the broadest sense are to be understood as all plants which grow in locations where they are undesired. Whether the active compounds according to the invention act as total herbicides or as selective herbicides depends largely on the amount of active compound employed.

The active compounds according to the invention can be used, for example, in the case of the following plants: dicotyledons, such as mustard (Sinapis), cress (Lepidium), cleavers (Galium), chickweed (Stellaria), chamomile (Matricaria), gallant soldier (Galinsoga), goosefoot (Chenopodium), annual nettle (Urtica), groundsel (Senecio), cotton (Gossypium), beets (Beta), carrots (Daucus) and beans (Phaseolus); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum) and sugar cane (Saccharum).

The active compounds according to the present invention can be converted into the usual formulations, such as solutions, emulsions, suspensions, powders, pastes and granulates. These may be produced in known manner, for example by mixing the active compounds with extenders, that is, liquid or solid or liquefied gaseous diluents or carriers, optionally with the use of surface-active agents, that is, emulsifying agents and/or dispersing agents. In the case of the use of water as an extender, organic solvents can, for example, also be used as an auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions, alcohols, such a butanol or glycol as well as their ethers and esters, ketones, such as acetone, methyl ethyl ketone, methyl isobutyl ketone or cyclohexanone, or strongly polar solvents, such as dimethyl formamide, dimethyl sulfoxide or acetonitrile, as well as water.

By liquefied gaseous diluents or carriers are meant liquids which would be gaseous at normal temperatures and pressures, e.g. aerosol propellants, such as halogenated hydrocarbons, e.g. freon.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic acid, alumina or ailicates.

Preferred examples of emulsifying agents include nonionic and anionic emulsifiers, such as polyoxyethylene-fatty acid esters, polyoxyethylene-fatty alcohol ethers, for example alkylarylpolyglycol ethers, alkyl sulfonates, alkyl sulfates and aryl sulfonates; and preferred examples of dispersing agents include lignin, sulfite waste liquors and methyl cellulose.

The active compounds according to the invention may be used in admixture with other active compounds.

The formulations contain, in general, from 0.1 to 95, preferably 0.5 to 90, percent by weight of active compound.

The active compounds can be employed as such or in the form of their formulations or the application forms prepared therefrom, such as ready-to-use solution emulsions, suspensions, powders, pastes and granules. They may be applied in the usual manner, for example by dusting, atomising, spraying, watering or scattering.

The amount of active compound employed can vary within a wide range. It generally depends on the nature of the desired effect. In general, the amounts employed are from 0.1 to 20 kg. of active compound per hectare, preferably 0.2 to 15 kg. per hectare.

The invention therefore provides a herbicidal composition containing as active ingredient a compound according to the invention in admixture with a solid or liquefied gaseous diluent or carrier or in admixture with a liquid diluent or carrier containing a surface-active agent.

The invention also provides a method of combating weeds which comprises applying to the weeds or their habitat a compound according to the invention alone or in the form of a composition containing as active ingredient a compound according to the invention in admixture with a diluent or carrier.

Use of the invention thus results in crops protected from damage by weeds being grown in areas in which, immediately prior to and/or during the time of the growing, a compound according to the invention was applied alone or in admixture with a diluent or carrier. It will be seen that the usual methods of providing a harvested crop may be improved by the present invention.

The invention is illustrated by the following Examples.

Example A shows the excellent herbicidal effectiveness of a typical compound according to the invention, while Examples 1 – 61 show various compounds according to the invention and their preparation.

EXAMPLE A

Pre-emergance test

Solvent: 5 parts by weight of acetone

Emulsifier: 1 part by weight of alkylaryl-polyglycolether

To produce a suitable preparation of active compound, 1 part by weight of active compound was mixed with the stated amount of solvent, the stated amount of emulsifier was added and the concentrate was then diluted with water to the desired concentration.

Seeds of the test plants were sown in normal soil and, after 24 hours, watered with the preparation of the active compound. It is expedient to keep constant the amount of water per unit area. The concentration of the active compound in the preparation is of no importance, only the amount of active compound applied per unit area being decisive. After three weeks, the degree of damage to the test plants was determined and characterized by the values 0 – 5, which have the following meaning:

0 no effect
1 slight damage or delay in growth
2 marked damage or inhibition of growth
3 heavy damage and only deficient development or only 50% emerged
4 plants partially destroyed after germination or only 25% emerged
5 plants completely dead or not emerged.

The active compound, the amounts applied and the results obtained can be seen from the following Table:

Table

| Active compound | Amount used, kg/ha | Pre-emergence test Beta (Beets) | Galinsoga | Urtica | Stellaria | Matricaria | Lolium |
|---|---|---|---|---|---|---|---|
| 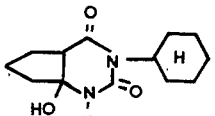 (compound 3) | 5 | 1–2 | 5 | 5 | 5 | 5 | 4–5 |
| | 2.5 | 1 | 5 | 5 | 5 | 5 | 4–5 |
| | 1.25 | 0 | 4 | 4–5 | 4–5 | 4 | 4–5 |
| | 0.85 | 0 | 3 | 3–4 | 4 | 4 | 4 |

| Active compound | Amount used kg/ha | Cotton | Galinsoga | Urtica | Stellaria | Matricaria | Lolium |
|---|---|---|---|---|---|---|---|
| 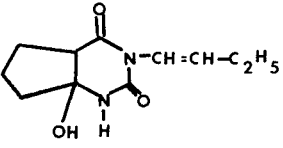 (compound 25) | 10 | 2 | 5 | 5 | 5 | 5 | 5 |
| | 5 | 1 | 5 | 5 | 5 | 5 | 4–5 |
| | 2.5 | 0 | 4–5 | 4–5 | 5 | 5 | 4–5 |
| | 1.25 | 0 | 4 | 4 | 4 | 4 | 4 |
| 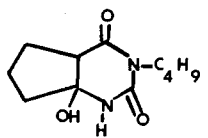 (compound 22) | 10 | 2 | 5 | 5 | 5 | 5 | 4–5 |
| | 5 | 1 | 5 | 5 | 5 | 5 | 4–5 |
| | 2.5 | 0 | 5 | 4 | 5 | 3 | 4 |

It will be understood that the specification and examples are illustrative but not limitative of the present invention and that other embodiments within the spirit and scope of the invention will suggest themselves to those skilled in the art.

What is claimed is:

1. 6-Hydroxy-dihydro-uracil compound of the formula

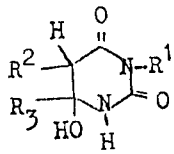

wherein $R^1$ is alkyl of from 1 to 13 carbon atoms, cyclohexylmethyl, cyclohexylidene-methyl, alkenyl of from 2 to 4 carbon atoms, haloalkyl of from 1 to 6 carbon atoms, cyanoalkyl of from 1 to 3 carbon atoms, alkoxycarbonylalkyl of from 2 to 3 carbon atoms, cycloalkyl of from 5 to 8 carbon atoms, methylcyclohexyl, plenyl, phenyl substituted with from one to three of methyl, halogen, halomethyl, methoxy and methylthio; naphthyl; phenylalkyl of from 1 to 2 carbon atoms in the alkyl moiety; or phenylcarbonyl;

$R^2$ is hydrogen or alkyl of from 1 to 2 carbon atoms;
$R^3$ is alkyl of from 1 to 3 carbon atoms; and
$R^2$ and $R^3$ taken together may be an alkylene bridge having 3 carbon atoms and forming a fused ring, which ring may be methyl substituted once or twice.

2. Compound as claimed in claim 1 wherein $R^1$ is alkyl of from 1 to 13 carbon atoms.

3. Compound as claimed in claim 1 wherein $R^1$ is alkenyl of from 2 to 4 carbon atoms.

4. Compound as claimed in claim 1 wherein $R^1$ is cycloalkyl of from 5 to 8 carbon atoms.

5. Compound as claimed in claim 1 wherein $R^1$ is haloalkyl of from 1 to 6 carbon atoms.

6. Compound as claimed in claim 1 wherein $R^1$ is haloalkyl of from 1 to 3 carbon atoms.

7. Compound as claimed in claim 1 wherein $R^1$ is alkoxycarbonylalkyl of from 2 to 3 carbon atoms.

8. Compound as claimed in claim 1 wherein $R^1$ is cyclohexylmethyl or cyclohexylidene methyl.

9. Compound as claimed in claim 1 wherein $R^1$ is phenyl or phenyl substituted with from one to three of methyl, halogen, halomethyl, methoxy and methylthio; naphthyl or phenylalkyl of from 1 to 2 carbon atoms in the alkyl moiety; or phenylcarbonyl.

10. Compound as claimed in claim 1 wherein $R^2$ is hydrogen.

11. Compound as claimed in claim 1 wherein $R^2$ is alkyl of from 1 to 2 carbon atoms.

12. Compound as claimed in claim 1 wherein $R^3$ is alkyl of 1 to 3 carbon atoms.

13. Compound as claimed in claim 1 wherein $R^2$ and $R^3$ together are alkylene of 3 carbon atoms wherein said alkylene may be substituted with one or two methyl groups.

14. Compound as claimed in claim 1 designated 3-(3'-chlorophenyl)-6-methyl-6-hydroxy-5,6-dihydro-uracil.

15. Compound as claimed in claim 1 designated 3-cyclohexyl-6-methyl-6-hydroxy-5,6-dihydro-uracil.

16. Compound as claimed in claim 1 designated 3-cyclohexyl-5,6-trimethylene-6-hydroxy-5,6-dihydro-uracil.

17. Compound as claimed in claim 1 designated 3-isobutyl-6-methyl-6-hydroxy-5,6-dihydro-uracil.

18. Compound as claimed in claim 1 designated 3-(ethoxy-carbonyl-methyl)-6-methyl-6-hydroxy-5,6-dihydro-uracil.

19. Compound as claimed in claim 1 designated 3-(1-cyanopropyl)-6-methyl-6-hydroxy-5,6-dihydro-uracil.

20. Process for preparing a 6-hydro-uracil compound of the formula

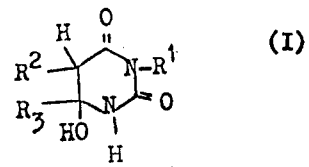

wherein $R^1$ is alkyl of from 1 to 13 carbon atoms, cyclohexylmethyl, cyclohexylidene-methyl, alkenyl of from 2 to 4 carbon atoms, haloalkyl of from 1 to 6 carbon atoms, cyanoalkyl of from 1 to 3 carbon atoms, alkoxycarbonylalkyl of from 2 to 3 carbon atoms, cycloalkyl of from 5 to 8 carbon atoms, methylcyclohexyl, phenyl substituted with from one to three of methyl, halogen, halomethyl, methoxy and methylthio; naphthyl, phenylalkyl of from 1 to 2 carbon atoms in the alkyl moiety; or phenylcarbonyl;

$R^2$ is hydrogen or alkyl of from 1 to 2 carbon atoms;
$R^3$ is alkyl of from 1 to 3 carbon atoms; and
$R^2$ and $R^3$ taken together may be an alkylene bridge having 3 carbon atoms and forming a fused ring, which ring may be methyl substituted once or twice;

which process consists essentially of reacting a 2,3-dihydro-1,3-oxazine-2,4-dione of the formula

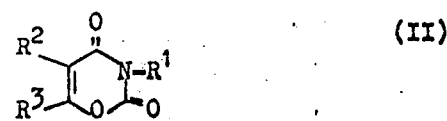

in which $R^1$, $R^2$ and $R^3$ and defined as above with ammonia at a temperature of $-50°C$ to $+50°C$ in which the substantial absence of water.

21. Process as claimed in claim 20 in which the reaction is carried out at a temperature from $-35°C$ to $+20°C$.

22. Process as claimed in claim 20 in which the reaction is carried out under a pressure of between 1 and 10 atmospheres.

23. Process as claimed in claim 20 in which the reaction is carried out in the presence of a diluent.

24. Process as claimed in claim 20 in which the diluent is an excess of liquid ammonia.

25. Process as claimed in claim 20 in which 1 to 100 mols of ammonia are employed per mol of the compound of formula (II).

26. Process as claimed in claim 20 in which 1 to 50 mols of ammonia are employed.

* * * * *